(12) United States Patent
Aymeloglu et al.

(10) Patent No.: US 8,984,390 B2
(45) Date of Patent: Mar. 17, 2015

(54) ONE-CLICK SHARING FOR SCREENSHOTS AND RELATED DOCUMENTS

(75) Inventors: Andrew Aymeloglu, Palo Alto, CA (US); Nicholas Miyake, Palo Alto, CA (US); Brandon Burr, Palo Alto, CA (US); Derek Cicerone, Palo Alto, CA (US); Kevin Simler, Palo Alto, CA (US); Garry Tan, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 954 days.

(21) Appl. No.: 12/556,313

(22) Filed: Sep. 9, 2009

(65) Prior Publication Data

US 2010/0070842 A1    Mar. 18, 2010

Related U.S. Application Data

(60) Provisional application No. 61/097,059, filed on Sep. 15, 2008, provisional application No. 61/122,695, filed on Dec. 15, 2008.

(51) Int. Cl.

| | |
|---|---|
| G06F 17/00 | (2006.01) |
| G06F 3/0486 | (2013.01) |
| G06F 17/22 | (2006.01) |
| G06F 17/27 | (2006.01) |

(52) U.S. Cl.
CPC .......... *G06F 3/0486* (2013.01); *G06F 17/2288* (2013.01); *G06F 17/2765* (2013.01)
USPC ......................................... 715/207; 715/724

(58) Field of Classification Search
CPC .................................................... G06F 3/1454
USPC .................................................. 715/207, 724
See application file for complete search history.

(56) References Cited

U.S. PATENT DOCUMENTS

| | | | |
|---|---|---|---|
| 5,241,625 A | 8/1993 | Epard et al. | |
| 6,237,138 B1 | 5/2001 | Hameluck et al. | |
| 6,944,821 B1 * | 9/2005 | Bates et al. | 715/209 |
| 7,880,921 B2 * | 2/2011 | Dattilo et al. | 358/1.18 |

(Continued)

OTHER PUBLICATIONS

"SnagIt Online Help Guide", Version 8.1, dated Feb. 7, 2007 by TechSmith Corp., p. 1-285, URL:<http://web.archive.org/web/20070207225331/http://download.techsmith.com/snagit/docs/onlinehelp/enu/snagit_help.pdf>.*

(Continued)

*Primary Examiner* — Andrew Dyer
*Assistant Examiner* — Mustafa Amin
(74) *Attorney, Agent, or Firm* — Hickman Palermo Truong Becker Bingham Wong LLP

(57) ABSTRACT

According to an embodiment, an application comprises a sharing mechanism that allows a user to 1) quickly generate an image of information from a document, such as a screenshot of information displayed in a graphical user interface; 2) concurrently generate a link to the document, and 3) simultaneously paste the image with the associated link in another application. The image and link are generated in response to a single user input, such as a click on a "one-click sharing button." The image and link are placed in a buffer, such as a clipboard, in such a manner that both may be retrieved via a single paste operation. Once pasted in another document, the image with the associated link may be shared with other users via email or any other suitable means. Techniques for pre-cropping and pre-annotating generated screenshots are also described.

38 Claims, 11 Drawing Sheets

(56) References Cited

U.S. PATENT DOCUMENTS

| | | | |
|---|---|---|---|
| 2002/0032677 | A1 | 3/2002 | Morgenthaler et al. |
| 2004/0205492 | A1* | 10/2004 | Newsome .................. 715/501.1 |
| 2005/0091186 | A1* | 4/2005 | Elish ................................ 707/1 |
| 2005/0234848 | A1* | 10/2005 | Lawrence et al. ................. 707/1 |
| 2006/0026561 | A1 | 2/2006 | Bauman et al. |
| 2006/0031779 | A1 | 2/2006 | Theurer et al. |
| 2006/0265417 | A1* | 11/2006 | Amato et al. ................. 707/102 |
| 2006/0277460 | A1* | 12/2006 | Forstall et al. ................. 715/513 |
| 2007/0061752 | A1* | 3/2007 | Cory .............................. 715/804 |
| 2007/0106952 | A1* | 5/2007 | Matas et al. ................... 715/764 |
| 2007/0245339 | A1* | 10/2007 | Bauman et al. ............... 717/174 |
| 2008/0016155 | A1 | 1/2008 | Khalatian |
| 2008/0109714 | A1 | 5/2008 | Kumar et al. |
| 2009/0089651 | A1* | 4/2009 | Herberger et al. ............ 715/202 |
| 2009/0109182 | A1* | 4/2009 | Fyke et al. ..................... 345/173 |
| 2009/0150868 | A1* | 6/2009 | Chakra et al. ................. 717/125 |
| 2009/0199106 | A1* | 8/2009 | Jonsson et al. ................ 715/744 |
| 2010/0223260 | A1* | 9/2010 | Wu ................................ 707/723 |
| 2011/0225482 | A1* | 9/2011 | Chan et al. .................... 715/207 |

OTHER PUBLICATIONS

"SNAGIT 8.1.0 Print Out", software release date: Jun. 15, 2006, pp. 1-6.*

"Microsoft Windows XP Verion 2002 Print Out", NPL, version release date: 2002, pp. 1-6.*

"SNAGIT 8.1.0 (release date Jun. 15, 2006) Print Out 2", NPL, version release date: Jun. 15, 2006, pp. 1-3.*

Lumox, "Save Images 1.0.7", date retrieved: Oct. 5, 2014, pp. 1-2, URL:<https://addons.mozilla.org/en-US/firefox/addon/save-images/>.*

Brade et al. "Pearl Crescent Page saver basic screenshot tool 2.8.2", date retrieved: Oct. 5, 2014, pp. 1-3, URL:<https://addons.mozilla.org/en-US/firefox/addon/pagesaver/>.*

"FastSone", date retrieved: Oct. 5, 2014, pp. 1-9, URL:<http://www.faststone.org/FSCaptureDetail.htm>.* digitalmedia.oreilly.com, O'Reilly digitalmedia, "Mac OS X Screenshot Secrets—O'Reilly Media", 7 pages, Feb. 1, 2006, retrieved from the internet, printed Feb. 11, 2010, http://digitalmedia.oreilly.com/2006/01/01/mac-os-x-screenshot-secrets.html.

online-tech-tips.com, "Clip2Net—Share files, folders and screenshots easily", 6 pages, Apr. 2, 2008, retrieved from the internet, printed Feb. 11, 2010, http://www.online-tech-tips.com/free-software-downloads/share-files-folders-screenshots/.

altchris.com, "GrabUp—What a Timesaver", 11 pages, Aug. 11, 2008, retrieved from the internet, printed Feb. 11, 2010, http://atlchris.com/191/grabup/ blog.nitropdf.com, "The PDF Blog", 3 pages, Mar. 4, 2008, retrieved from the internet, printed Feb. 11, 2010, http://blog.nitropdf.com/index.php/2008/03/04/trick-how-to-capture-a-screenshot-as-pdf-annotate-it-then-share/ tuaw.com, "TUAW Faceoff: Screenshot apps on the firing line", 20 pages, May 5, 2008, retrieved from the internet, printed Feb. 11, 2010, http://www.tuaw.com/2008/05/05/tuaw-faceoff-screenshot-apps-on-the-firing-line/.

subhub.com, "SnagIT Versus Free Screen Capture Software: Critical Tools for Website Owners", 10 pages, Mar. 27, 2008, retrieved from the internet, printed Feb. 11, 2010, http://www.subhub.com/articles/free-screen-capture-software.

PCT/US2009/056704, International Search Report and Written Opinion, Mailed Apr. 1, 2010, 11 pages.

"Registering an Application to a URL Protocol," Microsoft Developer's Network, accessed Apr. 4, 2009, available at http://msdn.microsoft.com/en-us/library/aa767914.aspx (3 pages).

"Using the Clipboard," Microsoft Developer Network, accessed Jun. 8, 2009, available at http://msdn.microsoft.com/en-us/library/ms649016.aspx (18 pages).

Schroeder, Stan, "15 Ways to Create Website Screenshots", retrieved from the internet dated Aug. 24, 2007, 7 pages.

European Patent Office, "Search Report" in application No. 09813696.3-1507, dated Apr. 9, 2014, 8 pages.

European Claims in application No. 09813696.3-1507, dated Apr. 2014, 6 pages.

Anonymous, "A Brilliant Way to Quote", Kwout, retrieved from the internet, dated Sep. 5, 2008, 2 pages.

Connor, Nancy, "Remove A Published Document or Blog Post", Sharing and Collaborating on Docuemnts, dated May 1, 2008, O'Reilly, Sabastopol, USA, 15 pages.

"JetScreenshot.com", Share Screen Shots Via the Internet in Seconds, retrieved from the internet on Aug. 8, 2013, 1 page.

* cited by examiner

FIG. 7

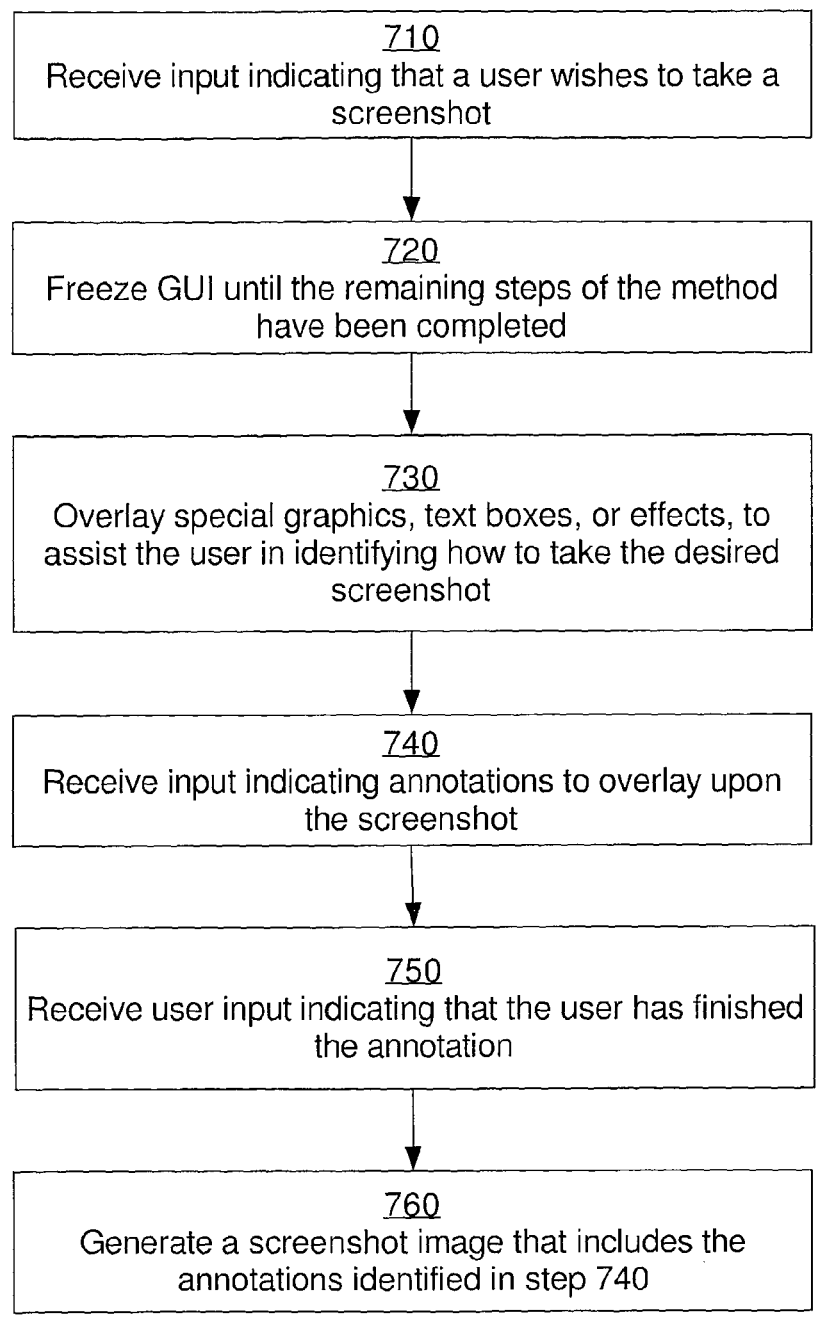

700

710 Receive input indicating that a user wishes to take a screenshot

720 Freeze GUI until the remaining steps of the method have been completed

730 Overlay special graphics, text boxes, or effects, to assist the user in identifying how to take the desired screenshot

740 Receive input indicating annotations to overlay upon the screenshot

750 Receive user input indicating that the user has finished the annotation

760 Generate a screenshot image that includes the annotations identified in step 740

FIG. 8

ONE-CLICK SHARING FOR SCREENSHOTS AND RELATED DOCUMENTS

PRIORITY CLAIM

This application claims the benefit of Provisional Application 61/097,059, entitled "Collaborative Interface Enhancements" and filed Sep. 15, 2008, the entire contents of which is hereby incorporated by reference as if fully set forth herein, under 35 U.S.C. §119(e). This application further claims the benefit of Provisional Application 61/122,695, entitled "WorkFlows, Screenshot Techniques, and Sharing Information across Servers" and filed Dec. 15, 2008, the entire contents of which is hereby incorporated by reference as if fully set forth herein, under 35 U.S.C. §119(e).

CROSS-REFERENCE TO RELATED APPLICATIONS

This application is related to U.S. patent application Ser. No. 12/556,321, entitled "Automatic Creation and Server Push of Drafts" and filed concurrently, the entire contents of which are hereby incorporated by reference for all purposes as if fully set forth herein.

FIELD OF THE INVENTION

Embodiments of the invention described herein relate generally to information sharing, and, more specifically, to techniques for efficiently sharing images derived from documents along with information about those documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In collaborative projects, it is often useful for project members to share information with each other. One way for a project member to share information with another project member is to share an image. An image may communicate information in a variety of ways. For example, an image may depict a chart, graph, map, picture, or textual passage.

One way for a project member to produce an image to share with other project members is for the project member to utilize image generation functionality in a document authoring application. For example, a document authoring application may allow a user to generate images of charts or graphs produced in the course of working with a report document. As another example, a document authoring application may also allow a user to generate a screenshot image of information currently depicted in the application. These images may then be shared with other project members.

A common technique for sharing an image is to embed the image in another type of document, such as an email, word-processing document, PDF document, or web page. The other document may then be shared with other project members. To facilitate the embedding of images into documents, many applications feature copy-and-paste functionality. Using a copy operation in a first application, information may be placed in a buffer, such as a clipboard buffer provided by an operating system. Using a paste operation in a second application, the information may be placed in a document being edited by the second application.

Although image sharing is useful for quickly communicating a limited amount of information, a weakness of the above-described techniques is that the techniques do not provide other project members with access to any information other than the information depicted in the image. Nor does the technique allow other project members to use or edit the information depicted in the image.

For example, a first project member may use a document authoring application to create a reporting document with very detailed data regarding stock prices over the course of several years. Using the document authoring application, the project member may then produce an image of a graph that summarizes the detailed data. The first project member may then share that image with other project members. While the other project members would be able to quickly interpret the summary information depicted in the graph, the other project members would be unable to access the more detailed data stored in the reporting document.

One solution to this problem would be for the first project member to send the reporting document to the other project members instead of the image. However, this solution has several drawbacks. First, the solution creates unnecessary copies of the reporting document. The unnecessary copies waste space, create security risks, and introduce potential data synchronization problems. Second, without sharing the image, the first project member loses the benefit of the image's efficiency in quickly communicating an overview of the information in the reporting document. Third, the solution is more labor-intensive for the first project member, since the solution requires the first project member to locate the reporting document in a file system so that it can be attached to an email or otherwise sent to the other project members.

Where the reporting document is available at a shared resource, such as a shared file system or web server, the first project member might instead share with other project members a link to the reporting document at the shared resource. However, while this strategy avoids the problem of unnecessary copies, the strategy is still vulnerable to the other two drawbacks discussed above. Moreover, this strategy may be problematic in that many users do not know how to share a link to a document stored on a shared resource.

Of course, the first project member may generate an image, paste the image into the other document, determine an appropriate link, and then paste that link into the other document. However, this technique further increases the work required of the first project member in sharing their information.

Yet another difficulty in communicating information via images is that images such as screenshots typically lack context. Without context, it is sometimes difficult to understand the significance of an image. For example, software applications such as the Palantir Finance client may display complicated GUIs with numerous controls, graphics, and other information. If a user wishes to communicate information about a trend that the user observed in a graph appearing in just a small corner of the GUI, the user would still be required to take a screenshot of the entire GUI. Another user looking at the screenshot may be unable to discern which part of the screenshot was relevant to the information the first user had intended to communicate.

One workaround for this problem would be to paste the screenshot into an external image editor and crop the screenshot. Another workaround would be to annotate the screenshot directly in the external image editor. The user may then send the cropped or annotated image to others. However, such workarounds are cumbersome. Moreover, such workarounds would be unavailable to one relying on the sharing mechanisms proposed by Applicants in "Collaborative Interface Enhancements."

Another difficulty in communicating information via screenshots is that it is sometimes impossible to take a screenshot of certain aspects of a GUI. For example, one may desire to take a screenshot of a pop-up window, pull-down box, or auto-complete box. Yet the very user input required to cause an operating system or application to take a screenshot may also cause the pop-up window, pull-down box, or auto-complete box to disappear. In the Microsoft Windows operating system, for example, the keystroke combination ALT-PRINT SCREEN is required to take a screenshot of an application window. However, the ALT key will often cause a pop-up window or pull-down box to disappear before the ALT-PRINT SCREEN keystroke combination is registered by the operating system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 is a flow chart 700 illustrating a method for pre-annotating a screenshot;

FIG. 8 illustrates a GUI window 800 in which annotations have been added;

DETAILED DESCRIPTION

Figure 1:
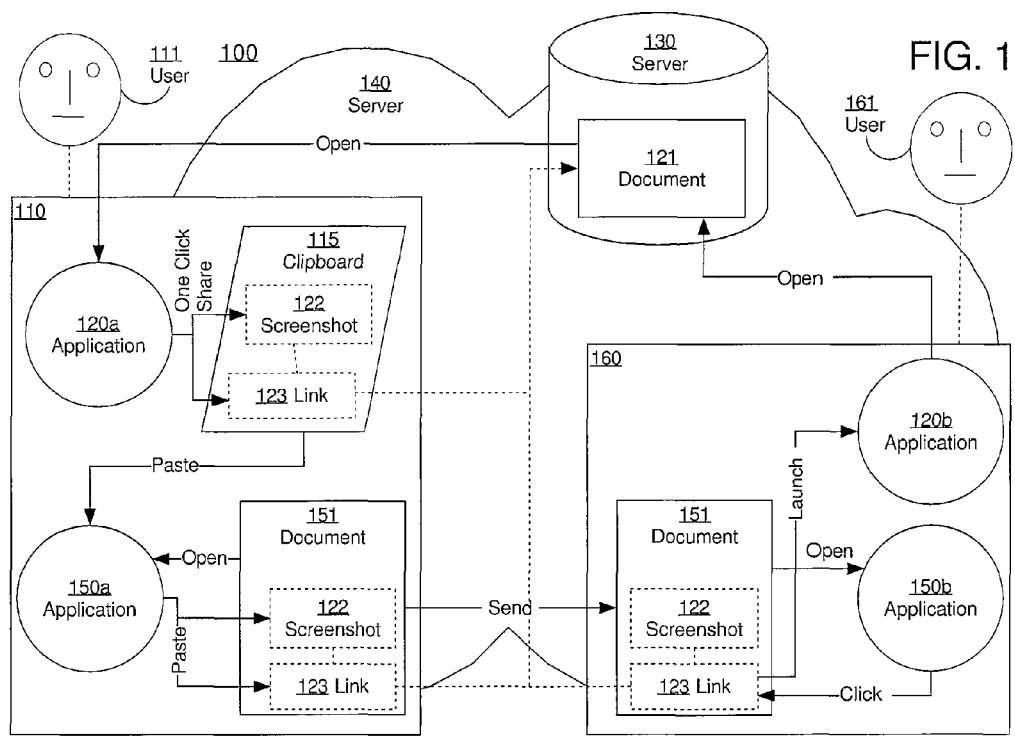
FIG. 1 is a block diagram that illustrates a system 100 for sharing information between users.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   1.1. Terms and Definitions
2.0. Structural Overview
3.0. Functional Overview
   3.1. One-Click Sharing
   3.2. Pre-Cropping Screenshots
   3.3. Pre-Annotating Screenshots
   3.4. Preserving All Visible Information in a Screenshot
4.0. Example Implementation Details
   4.1. Example Buffer
   4.2. Sharing the Image and Link
   4.3. Reference Drafts
   4.4. Example Protocol
   4.5. Other Embodiments
5.0. Implementation Mechanism—Hardware Overview
6.0. Extensions and Alternatives 1.0. General Overview Approaches, techniques, and mechanisms are disclosed for the efficient sharing of information between multiple users. According to an embodiment, an application provides a user with an efficient mechanism for simultaneously sharing access to documents that store information along with media, such as images, that overview or are derived from that information.

According to an embodiment, an application comprises a sharing mechanism that allows a user to 1) quickly generate an image of information from a document, 2) concurrently generate a link to the document, and 3) simultaneously paste the image with the associated link in another application. In response to a user action that implicates this sharing mechanism, the application generates an image, such as a screenshot, that depicts information from a document that has been opened in the application. The application places the image, along with an associated link to the document, in a buffer, such as a system clipboard. While in another document authoring application, such as a word-processor or email application, the user pastes the contents of the buffer into another document that has been opened in the other application. An image is therefore placed in the other document along with the associated or embedded link.

The other document is then shared with another user. The other user opens the other document in another instance of the other application. The other user views the embedded image for a quick overview of the information in the original document. If the other user requires access to the information in the original document, the other user may select or click on the embedded image. This selection causes the other application to activate the associated link. In response, the other application causes another instance of the original application to launch and open the original document for the other user.

In an embodiment, an application provides a user with functionality for cropping a screenshot prior to taking the screenshot. The application may receive initial input indicating that the user wishes to take a cropped screenshot. The application may then receive user input selecting a pre-defined or arbitrary region of the GUI for the screenshot. In response to the latter input, the application may generate an image of the selected region of the GUI.

According to an embodiment, an application may provide a user with functionality for annotating a screenshot prior to taking the screenshot. The application may receive initial input indicating that the user wishes to take a screenshot. The application may then receive input indicating annotations, such as graphics and text, to layer over the GUI. The application may then receive input indicating that the application should take the screenshot. In response to the latter input, the application may generate an image of the GUI with the overlaid annotations.

According to an embodiment, an application may accept, as input for initiating a screenshot, input that does not affect the visual appearance of the GUI. For example, the application may be configured to listen for a certain keystroke that does not affect the GUI. In response to receiving such input, the application may capture an initial screenshot of the GUI. The application may then render the initial screenshot over the GUI, so that it appears to the user that the GUI is frozen. The application may then accept input that filters or annotates the GUI, as discussed above. Finally, the application may receive input that finalizes the screenshot.

According to an embodiment, once an application has generated a screenshot image, the application may save the image to a file, place the image in a system clipboard, and/or share the image with other users via the techniques described herein.

In other aspects, the invention encompasses a computer apparatus and a computer-readable medium configured to carry out the foregoing steps.

1.1. Terms and Definitions

For convenience, various embodiments of the techniques described herein are described with respect to "documents." As used herein, a document is any type of object, including files and other resources, that embodies, encapsulates, or encodes information in data formatted in such a manner so as to be understood by one or more document authoring applications. An application understands the format of data in an object when the application, upon reading the data, may perform various actions with the information represented by the object, such as presenting the information to a user. Documents may include word processing files, PDF files, images, and any other form of structured data. Moreover, a document authoring application is any application that may interpret a document in such a manner so as to deliver one or more visual presentations of the information embodied, encapsulated, or encoded in the document.

For convenience, various embodiments of the techniques described herein are described with respect to "screenshots." Generally, a screenshot is an image that captures the graphical content of a computer screen at a given time, encoded as data in an image-based format (e.g. a bitmap file). However, the techniques described herein are applicable to many types of media other than "screenshots," including other types of images, slideshows, presentations, and videos. Thus, unless otherwise noted, any technique or step described herein as involving a "screenshot" or an image, is likewise applicable to any media derived from or based on a document being viewed or otherwise utilized in a document authoring application.

For purposes of clarity, a document containing information from which an image is generated may be herein referred to as an "original document." An application in which the original document may be opened may be referred to as an "original application." A document in which a generated image is embedded may be referred to as the "other document." An application in which the other document may be opened may be referred to as "the other application."

2.0. Structural Overview

FIG. 1 is a block diagram that illustrates a system 100 for sharing information between users, according to an embodiment of the invention. System 100 may be any system in which data may be shared between users, including a financial analysis system such as deployed by Palantir Finance.

System 100 includes a computing device 110 operated by a user 111. Computing device 110 executes an application 120a. Application 120a is a document authoring application, such as a web browser, word processor, or Palantir Finance client. Application 120a presents to user 111 information derived from a document 121. As depicted, document 121 is structured data stored in memory at server 130. However, document 121 may be stored at any location accessible to application 120a, including at computing device 110.

Server 130 is a computing device connected to system 100 via a network 140. Network 140 may be, for instance, an internet or intranet. Server 130 may be any computing device capable of sharing structured data with computing devices connected to network 140, including a web server, file server, or Palantir Finance server.

While viewing document 121 in application 120a, user 111 may utilize a sharing mechanism, as described in section 3.1. In response, application 120a may generate an image, such as screenshot 122, and a link, such as link 123. Screenshot 122 may be, for instance, a bitmap or other graphical representation of the information from document 121 being presented by application 120a. Link 123 may be data indicating the location of document 121, such as a Uniform Resource Identifier (URI).

Application 120a places screenshot 122 and link 123 in a buffer, such as system clipboard 115, that is shared by one or more other applications executing at computing device 110. Screenshot 122 and link 123 are associated together in clipboard 115.

User 111 may then switch to or open another document 151 in another application 150a executing at computing device 110. Application 150a may be, for instance, another document authoring application capable of editing document 151. Document 151 may be, for instance, an email or word processing document. As depicted, document 151 resides in memory at computing device 110. However, document 151 may reside at any location accessible to application 150a.

While editing document 151, user 111 may cause application 150a to retrieve screenshot 122 and link 123 from clipboard 115 so that they may be "pasted" into document 151. In an embodiment, both screenshot 122 and link 123 are retrieved as part of just a single paste operation. Screenshot 122 and link 123 are then embedded together in document 151.

System 100 further includes computing device 160 operated by user 161. Computing device 110 executes an application 150b. Application 150b is any application capable of viewing document 151, including another instance of application 150a. User 161 utilizes application 150b to view document 151. For example, user 111 may have emailed document 151 to user 161. Or, user 111 may have saved document 151 at a location accessible to computing device 160.

Because screenshot 122 and link 123 have been embedded in document 151, user 161 is able to view screenshot 122 and select link 123. In response to user 161 selecting link 123, computing device 160 identifies the location of document 121, as indicated by link 123. Further in response to user 161 selecting link 123, computing device 160 determines that it is capable of executing an application 120b for viewing document 121. Application 120b is any application capable of viewing document 121, including another instance of application 120a. Upon this determination, computing device 160 executes application 120b and opens document 121 for viewing.

System 100 is but one example of a system in which the techniques disclosed herein may be practiced. Various embodiments of the invention may be practiced in other systems having more or fewer components. For example, some embodiments may not require a server 130. As another example, some embodiments may involve only a single user at a single computing device saving document 151 for future reference.

3.0. Functional Overview

3.1. One-Click Sharing

Figure 2:
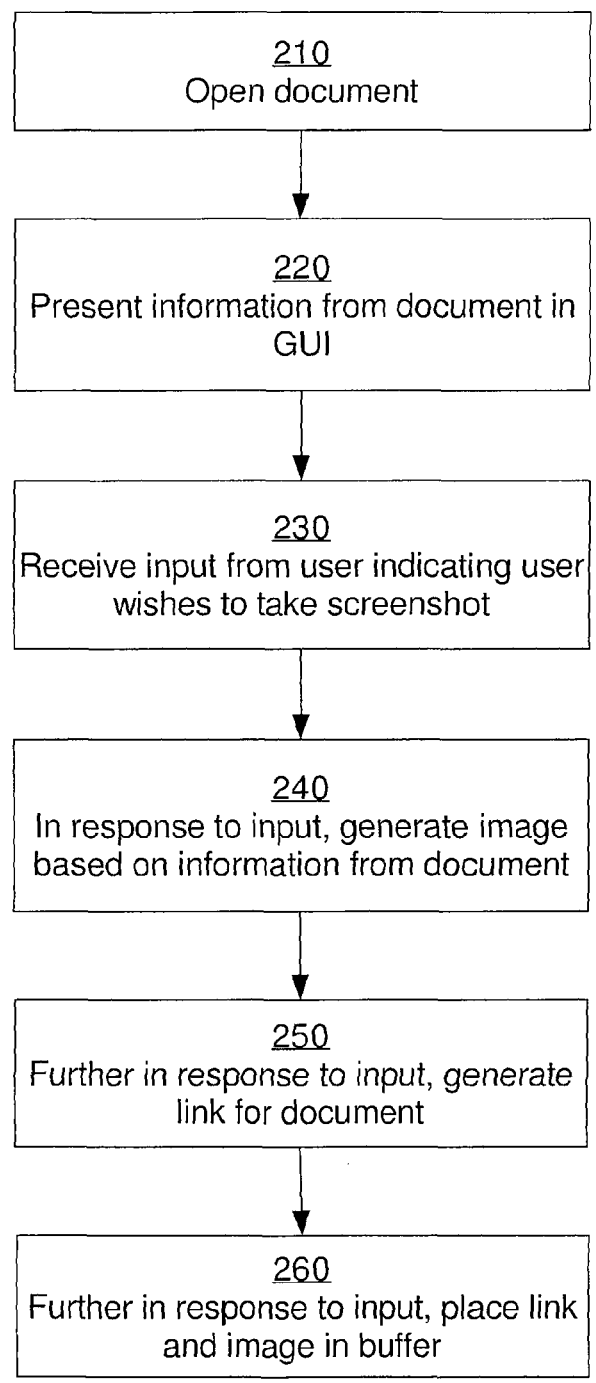
FIG. 2 is a flow chart 200 for an example method of sharing information from a document.

FIG. 2 is a flow chart 200 for an example method of sharing information from a document. The steps described above are only examples of steps that may be employed according to an embodiment of the invention. Other embodiments may require more or fewer steps, in different orders.

At step 210, an application "opens" a document. The application may, for example, open the document for viewing or editing.

At step 220, the application displays information from the document in a graphical user interface. As used herein, "information from the document" may be any data contained in the actual document, as well as any information collected or generated based on the data within the document. For example, the document may contain data that, when interpreted by the application, causes the application to collect information from one or more databases and then format that information for display in a graphical user interface. One such document may contain, for instance, data that causes the application to generate an interactive display of graphed financial data.

At step 230, a user submits input that indicates that the user wishes to generate an image based on information from the document. The input may be any suitable input, including, for example, a keystroke, control selection, or mouse click. The user may submit this input to the application itself, or the user may submit it to any other process running on the computing device, such as a background or system process that listens for certain input. For instance, a background application may feature one or more buttons for receiving such input. As another example, an operating system may listen for a certain keystroke combination that indicates that the user wishes to take a screenshot.

Figure 3:
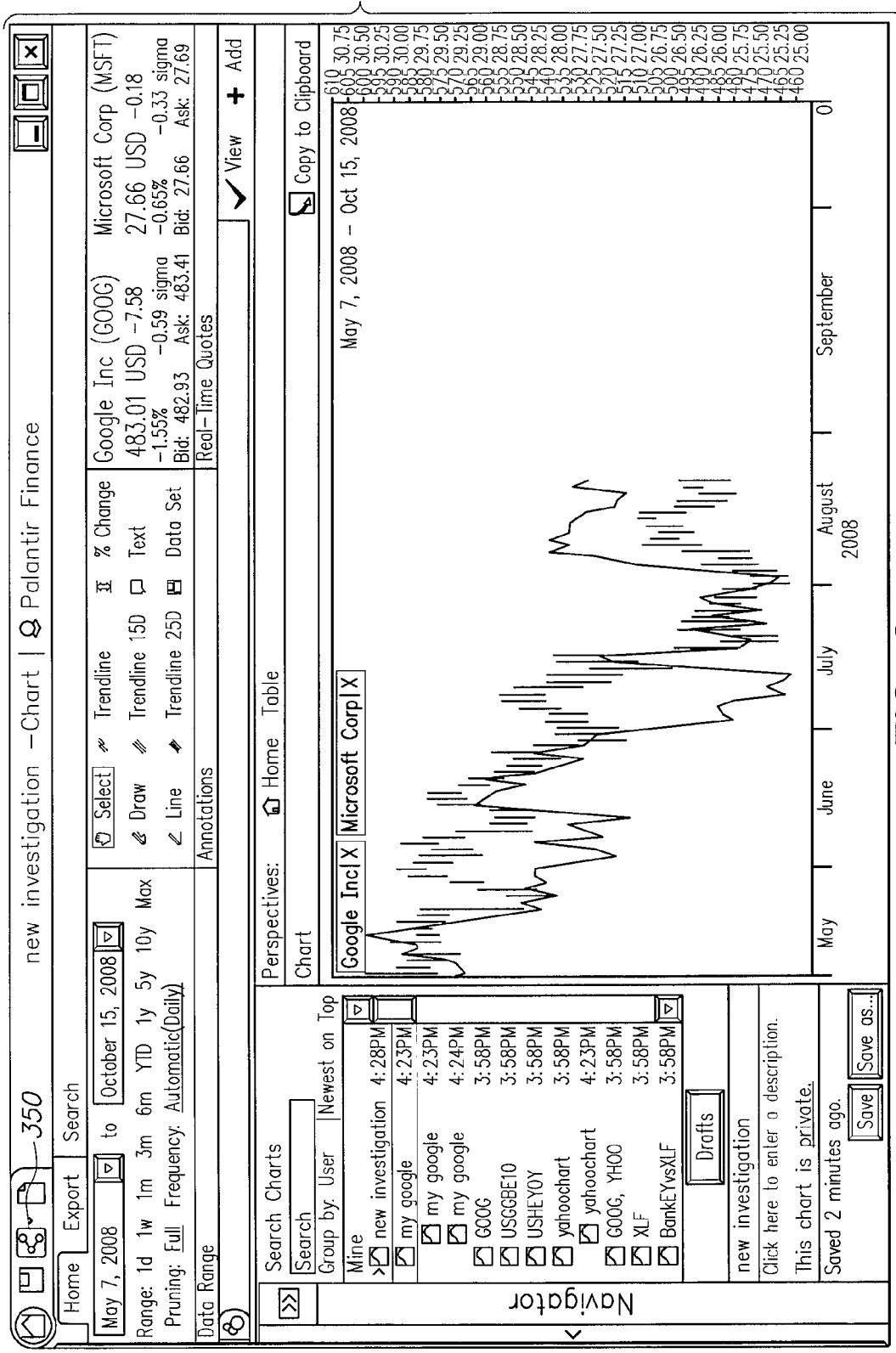
FIG. 3 illustrates an example graphical user interface (GUI) of an application configured to provide "one-click sharing;"

According to an embodiment, the input of step 230 comprises the user clicking on a "one-click sharing" button. For example, FIG. 3 illustrates an example graphical user interface (GUI) of an application configured to provide "one-click sharing." GUI 300 includes a visual representation of a financial document named "new investigation." Control 350 is a button that allows a user to submit input indicating the user's intent to take a screenshot of the information presented in GUI 300. In response to a user clicking on button 350, the application may (1) take a screenshot of the information in GUI 300, (2) generate a link to the document "new investigation," and (3) place both the link and the screenshot in a system clipboard for use in other applications.

According to an embodiment, the input of step 230 is a single input event. For example, the input may be a single mouse click, single menu selection, or single keystroke combination.

According to an embodiment, the input is received subsequent to an initial input indicating that the user wishes to take a formatted screenshot, and/or one or more additional inputs to an interface for formatting or filtering the screenshot, as discussed in sections 3.2 and 3.3.

At step 240, in response to the input from the user in step 230, the application or process that received the input generates an image based on information from the document. The image indicates a visual representation of at least a portion of the information. For example, the application may take a screenshot of the information displayed in step 220. Or, the application may execute an image generation routine to translate the document or portions thereof into visual information. The image may be in any suitable format, including bitmap (BMP), Portable Document Format (PDF), Tagged Image Format (TIFF), or Joint Photographic Experts Group (JPEG).

The generated image may depict a variety of information stored in or generated from a currently opened document. For example, the image may be a screenshot of information currently being presented to the user, such as graphs or tables. The screenshot may comprise an image bitmap of the current application window or active application window. The screenshot may be of the entire application window, or a designated portion thereof. As another example, the application may feature built-in routines for generating various summary images of the document in response to a user selecting various buttons or menu items in the graphical interface.

At step 250, further in response to the input from the user in step 230, the application or process generates a link to the document. The link may be any type of location identifier, including a URI, URL, UNC path, or file system path. The link identifies a location at which the opened document may be accessed. According to an embodiment, the identified location is "unique," in that any user attempting to access a document at the identified location is guaranteed to access only the document that was open in the original application when the input of step 230 was submitted (assuming the document is not interveningly moved). In an embodiment, the link uniquely identifies the document by name, number, or other identifier. In some embodiments, the identified location includes a path that is relative to the user. In some embodiments, the path is also relative to one or more other users who may wish access the document. In some embodiments, the link identifies a protocol, a server address, and an action to perform with respect to the document. A specific link protocol is described further below in section 4.4.

At step 260, also further in response to the input from the user in step 230, the application or process places the image and the link in a buffer. For example, the image and the link may be stored in a system buffer, as described in section 4.1. The image and the buffer are associated together in the buffer. In an embodiment, the image and link are stored in the buffer in a manner that causes one or more applications to, in response to a single paste operation, paste both the image and the link into another document. As used herein, a "single paste operation" refers to a paste operation that occurs in response to a single input event, such as a selection of a "paste" menu item in a right-mouse-click menu, or a submission of a creation keystroke combination.

Because steps 240-260 are all performed in response to the same input of step 230, the process of sharing information is greatly simplified for the user. The method may thus be characterized as "one-click sharing," even though a "click" is just one of the many types of triggering inputs, and the method may in some embodiments require more than one input.

As stated above, in some embodiments a process other than the original application (such as a background application or an operating system service) may be responsible for receiving the input of step 230. In some embodiments, this other process may communicate with the original application via an application programming interface (API) to obtain from the application any information necessary for the process to perform steps 240-260. Additionally, the process may also utilize this API to cause the application to perform some or all of steps 240-260.

3.2. Pre-Cropping Screenshots

Figure 4:
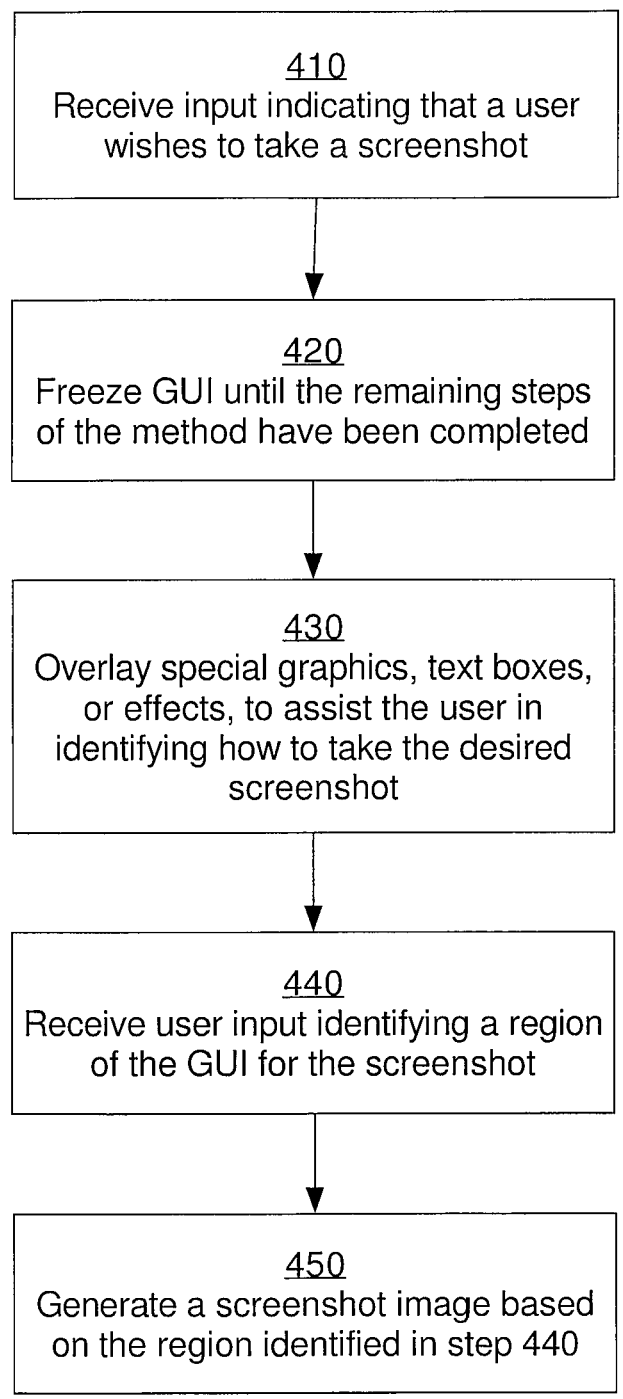
FIG. 4 is a flow chart 400 illustrating a method for pre-cropping a screenshot.

FIG. 4 is a flow chart 400 illustrating a method for pre-cropping a screenshot.

Figure 5:
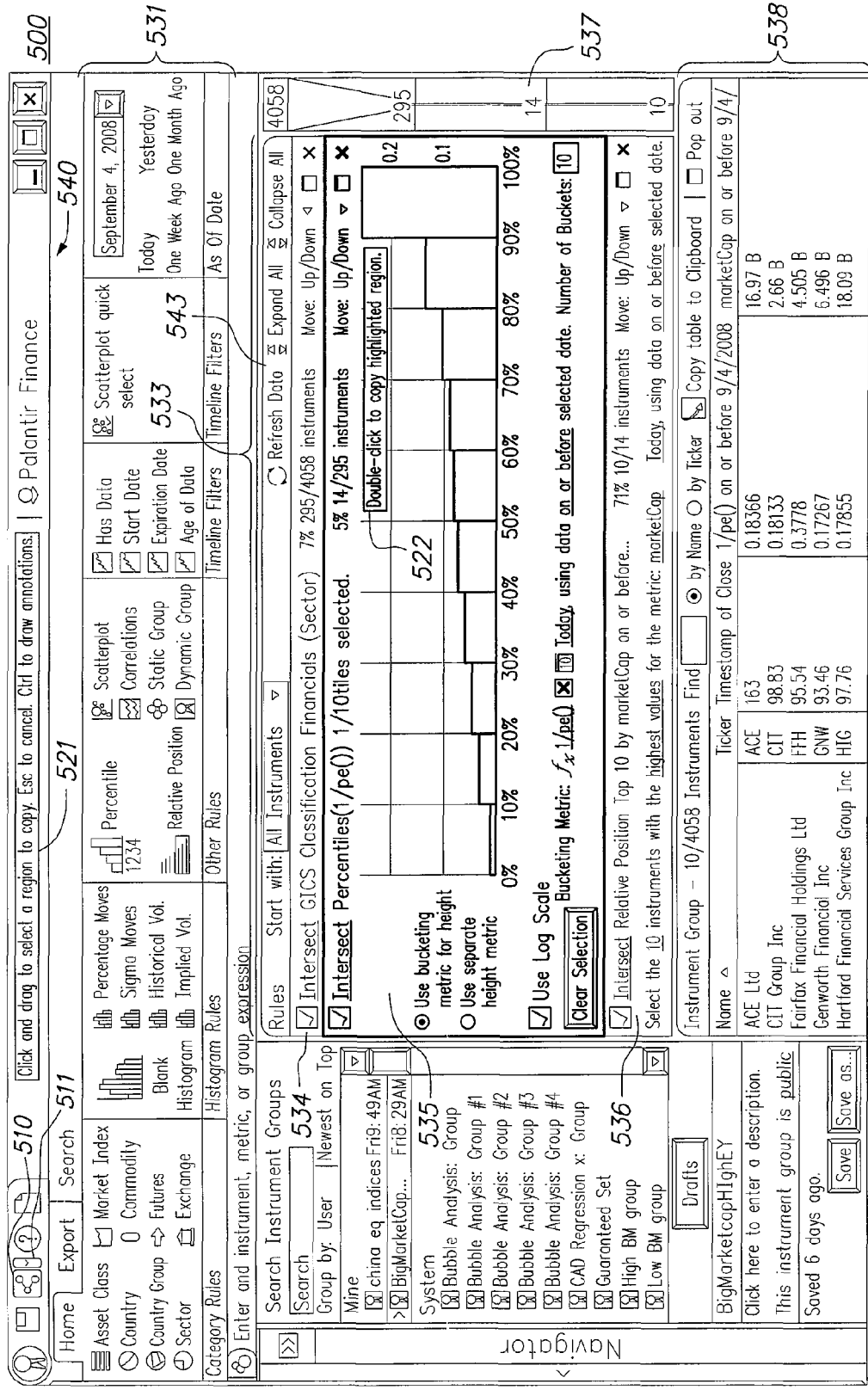
FIG. 5 illustrates an example GUI window 500 for an application that allows for screenshot pre-cropping.

At step 410, an application, such as a Palantir Finance client, receives input indicating that a user wishes to take a screenshot. The application may receive this input in a variety of ways, including keystrokes, keystroke combinations, and selection of an interface control for taking a screenshot. For example, FIG. 5 illustrates an example GUI window 500 for an application that allows for screenshot pre-cropping. Button 510 of GUI window 500 is an example of an interface control for taking a screenshot. A user may select button 510, for example, by clicking on it with a mouse.

According to an embodiment, selection of button 510 may instead indicate to the application that the user wishes to cause the application to take a simple screenshot of the entire interface for a one-click sharing operation, as described above. In such an embodiment, a user may instead create a pre-cropped screenshot by selecting pull-down button 511. In response, the application may present a menu of controls for more complex screenshot operations, including a special control for indicating to the application that the user wishes to take a pre-cropped screenshot. In this embodiment, step 410 may thus entail the application receiving input from the special control.

At step 420, the application may optionally respond to the input of step 410 by freezing the graphical user interface until the remaining steps of the method have been completed. Performance of such a step may allow a user to identify an appropriate region in subsequent steps without affecting the visual appearance of the GUI. However, an application may still take a pre-filtered screenshot without performing this method. In fact, in some embodiments, it is useful to leave the GUI unfrozen, so that the user may further manipulate the GUI prior to taking the screenshot.

At step 430, the application may optionally overlay upon the GUI special graphics, text boxes, or effects, to assist the user in identifying how to take the desired screenshot. For example, the application may overlay pop-up boxes, such as pop-up boxes 521 and 522, which instruct the user as to which keystrokes or mouse actions the user may take to select a region and/or cause the application to take the screenshot.

As another example, the application may apply a colored or shaded overlay to the entire GUI to indicate that a screenshot has been initiated. For example, a darkening filter has been applied over almost the entire GUI window 500. The application may then apply a different overlay to the current focus region—i.e. the region of the GUI that would currently be used for the screenshot if the user were to cause the application to take the screenshot. For example, with regards to FIG. 5, the mouse is depicted as being over pre-defined region 535. Region 535 would be used for the screenshot if the user were to double-click with the mouse in the position it is depicted. Consequently, the application has overlaid a lighter filter upon region 535 as compared to the darker filter over GUI window 500. In other embodiments, however, the application may leave the current focus region without an overlay.

At step 440, the application receives user input identifying a region of the GUI for the screenshot. This user input may take a variety of forms. According to an embodiment, the GUI may comprise a number of pre-defined regions, such as pre-defined regions 531-538. The application may listen to mouse events in order to determine the current position of the mouse with respect to the pre-defined regions. If the user clicks—or, in some embodiments, double-clicks—the mouse while over a particular pre-defined region, the application may determine that the user input has identified the particular pre-defined region as the desired screenshot region. As another example, a GUI may allow a user to switch between pre-defined regions using arrow keystrokes. Once the user has finally selected the desired region for the screenshot, the user may then enter another keystroke such as [Enter] to indicate that the selected region is to be used for the screenshot.

Certain regions, known as parent regions, may include several sub-regions. Such is the case with regards to parent region 533 and sub-regions 534-536. Such is also the case with respect to the entire GUI window 500, which is itself a parent region for all of regions 531-538. When the user's mouse is over a sub-region, it may not be apparent to the application whether the user intends to take a screenshot of the sub-region or the parent region. According to an embodiment, the application may assume that the sub-region is the intended region. For the user to select a parent region, the user must select the title bar for that region. Thus, the user may click on title bar 543 to select region 533 for the screenshot and title bar 540 to select the entire GUI window 500 for the screenshot. The application may make similar assumptions with respect to the position of the mouse in determining which region to indicate as the current focus region.

Figure 6:
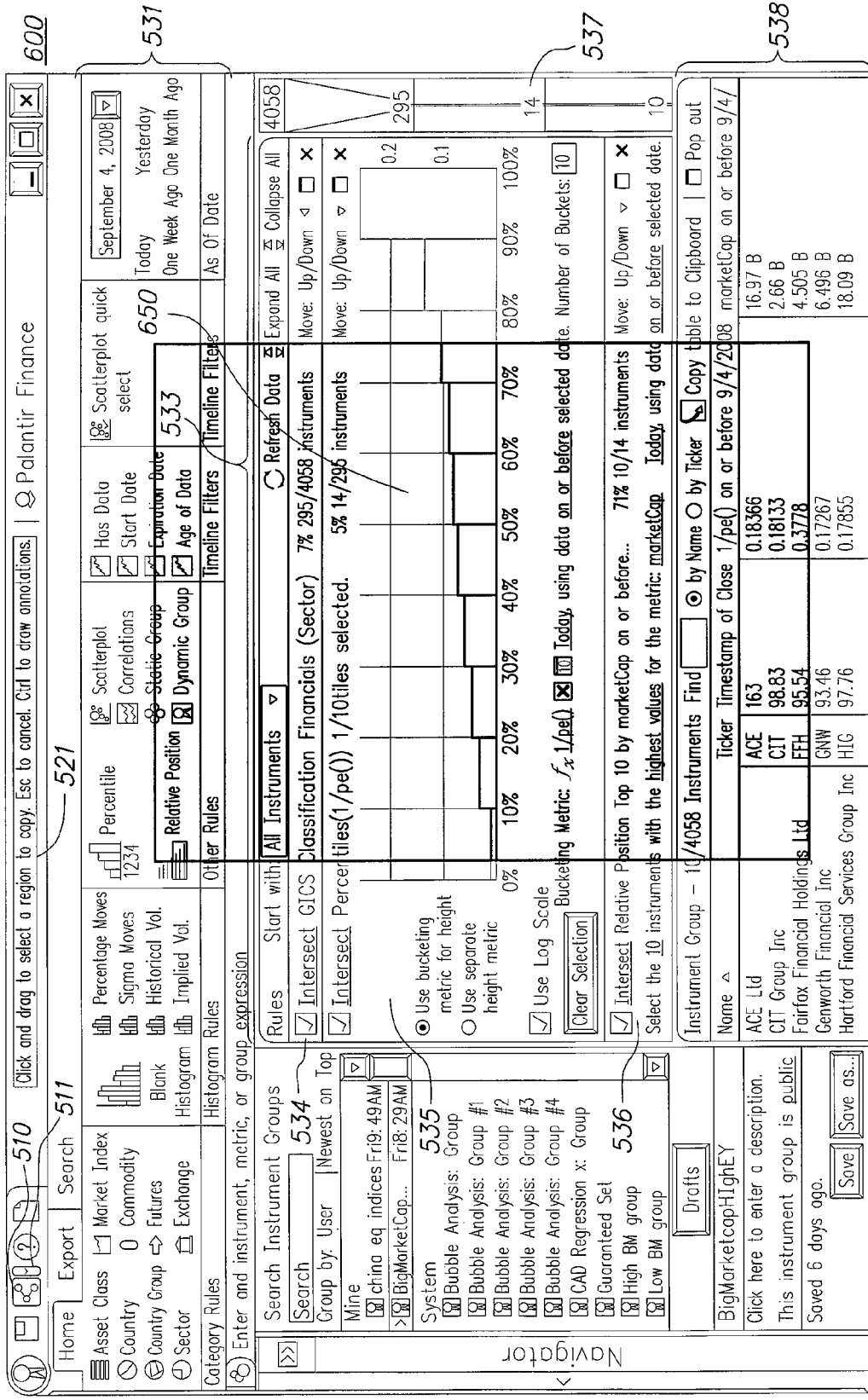
FIG. 6 illustrates an example GUI window 600 for receiving user input identifying an arbitrary region.

In an embodiment, the GUI may receive user input identifying an arbitrary region of the GUI. For example, a user may click on a first location in the user interface, then drag out a rectangle over the GUI to define an arbitrary region for the screenshot. FIG. 6 illustrates an example GUI window 600 for receiving user input identifying an arbitrary region. GUI window 600 is similar to GUI window 500 in almost all respects except for that the selected region 650 is not a pre-defined region of the GUI window 600. Instead, the user has identified the focus region 650 by clicking on a mouse and dragging out a rectangle.

Alternatively, a user may define an arbitrary region using other techniques. For example, a user may use a freeform or other drawing tool to define an arbitrary region for the screenshot.

According to an embodiment, the application treats the arbitrary region as the region which has been selected for the screenshot. According to another embodiment, the application expands screenshots of arbitrarily defined regions to include any pre-defined region that appears, at least in part, in the arbitrarily defined region.

At step 450, the application may generate a screenshot image based on the region identified in step 440. In some embodiments, the application performs step 450 in response to the input of step 440. In other embodiments, the application performs step 450 in response to receiving additional input after the input of step 440. For example, the application may wait for the user to press a certain key or click on a certain GUI button before performing step 450.

3.3. Pre-Annotating Screenshots

FIG. 7 is a flow chart 700 illustrating a method for pre-annotating a screenshot.

At step 710, an application receives input indicating that a user wishes to take a screenshot. In some embodiments, the input may be the same as that received in step 410 of FIG. 4 for pre-cropping a screenshot. For example, steps 410 and 710 may both be triggered by the user clicking on a common button that indicates that the user would like to pre-format the screenshot. In other embodiments, the input received in step 710 may be different than the input received in step 410. For example, pull-down menu 511 may feature a different control for generating a screenshot with annotations.

At step 720, as in step 420 of FIG. 4, the application may optionally respond to the input of step 710 by freezing the graphical user interface until the remaining steps of the method have been completed.

At step 730, as in step 430 of FIG. 4, the application may optionally overlay upon the GUI special graphics, text boxes, or effects, to assist the user in identifying how to take the desired screenshot.

At step 740, an application receives input indicating annotations to overlay upon the screenshot. This input may be received via a wide variety of drawing techniques. For example, the user may hold down a key or button while the user moves a mouse or other input device. Or the user may use the mouse to indicate a position for a text box, and then enter text for the text box via a keyboard. The application may also present GUI controls that allow the user to select between different drawing techniques, including controls that allow a user to draw defined or free-form shapes, insert textboxes, erase portions of the drawing, fill portions of the drawing with a certain color, change drawing colors, and so on.

Figure 8:
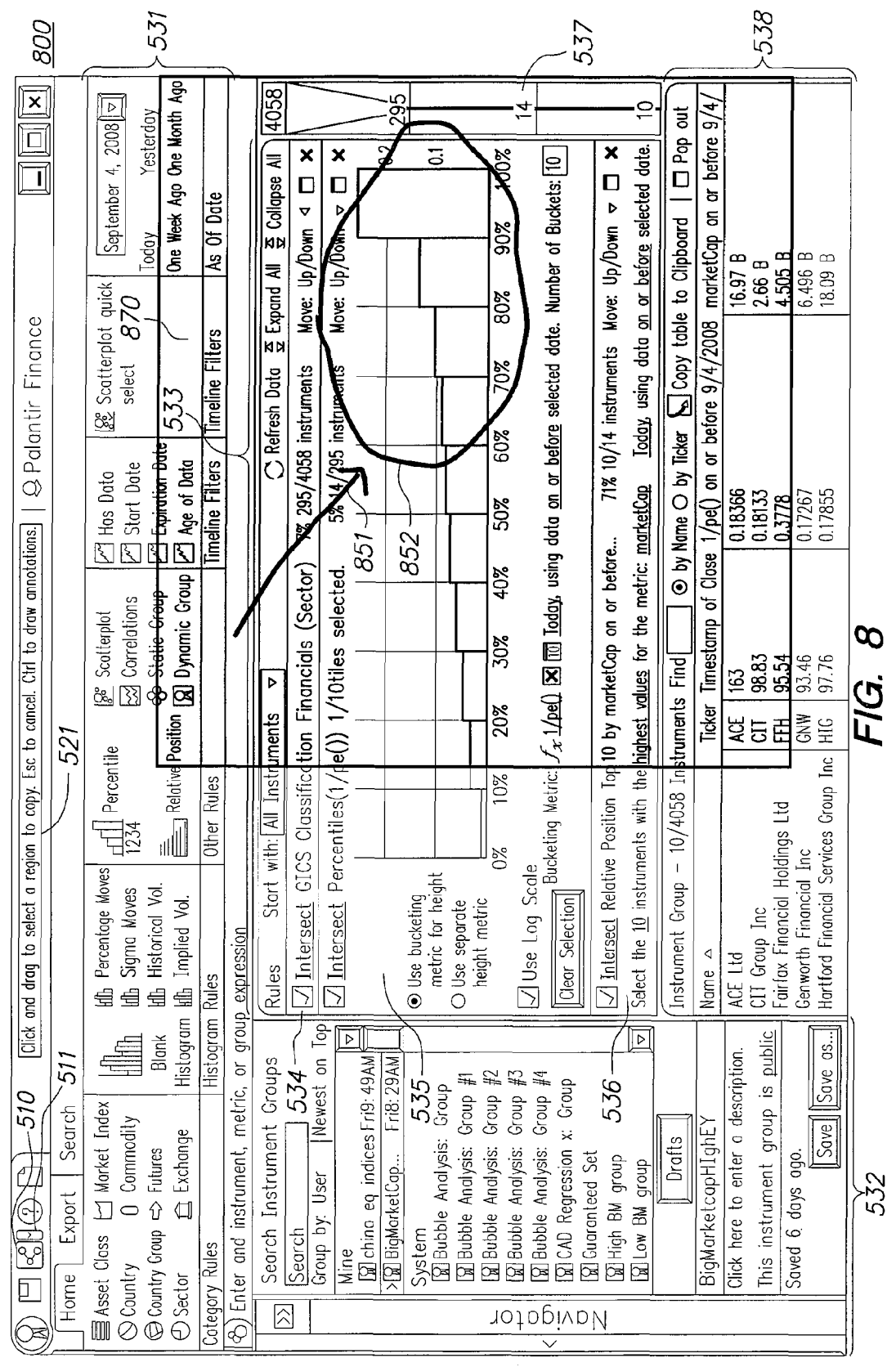

FIG. 8 illustrates a GUI window 800 in which annotations have been added. GUI window 800 is similar to GUI windows 500 and 600, except that GUI window 800 includes annotations 861 and 862.

In an embodiment, as implied by the guidance text of pop-up box 521, the input indicating annotations may further include an initial input that causes the application to interpret subsequent input as an annotation. For example, the application may listen for a certain key press, such as the CTRL key. Once the application receives this input, the application may present controls for allowing the user to annotate the screenshot. Or, the application may assume that any mouse movement received after the user presses CTRL is intended to indicate a free-form annotation. Or, the application may assume that any mouse movement received while the CTRL key is being held down is an annotation.

At step 750, the application optionally receives user input indicating that the user has finished the annotation. For example, the user may press a certain key or click on a certain button when the user has finished the annotation. As another example, in the case of the application assuming that mouse movement received while a certain key is pressed indicates an annotation, the application may receive input indicating that the key has been released.

In some embodiments, steps 740 and 750 may be repeated, thereby allowing for multiple annotations.

At step 760 the application generates a screenshot image that includes the annotations identified in step 740. The application may perform step 760 in response to the input of steps 740 or 750. Alternatively, the application performs step 760 in response to receiving additional input after the input of step 750. For example, the application may wait for the user to press a certain key or click on a certain GUI button before performing step 760.

As suggested by the placement of annotations 861 and 862 in region 870 of FIG. 8 (which, as implied by its lighter overlay filter, may be the region of GUI window 800 that has been selected for the screenshot), the methods depicted in flow charts 700 and 400 may be combined. The application may satisfy steps 410-430 by performing the same actions as used to satisfy steps 710-730. Step 440 may then be performed before or after steps 740 and 750, resulting in annotations that are placed in a cropped region of the GUI window. The application may then perform steps 450 and 760 together by generating a single cropped and annotated screenshot.

3.4. Preserving All Visible Information in a Screenshot

Figure 9:
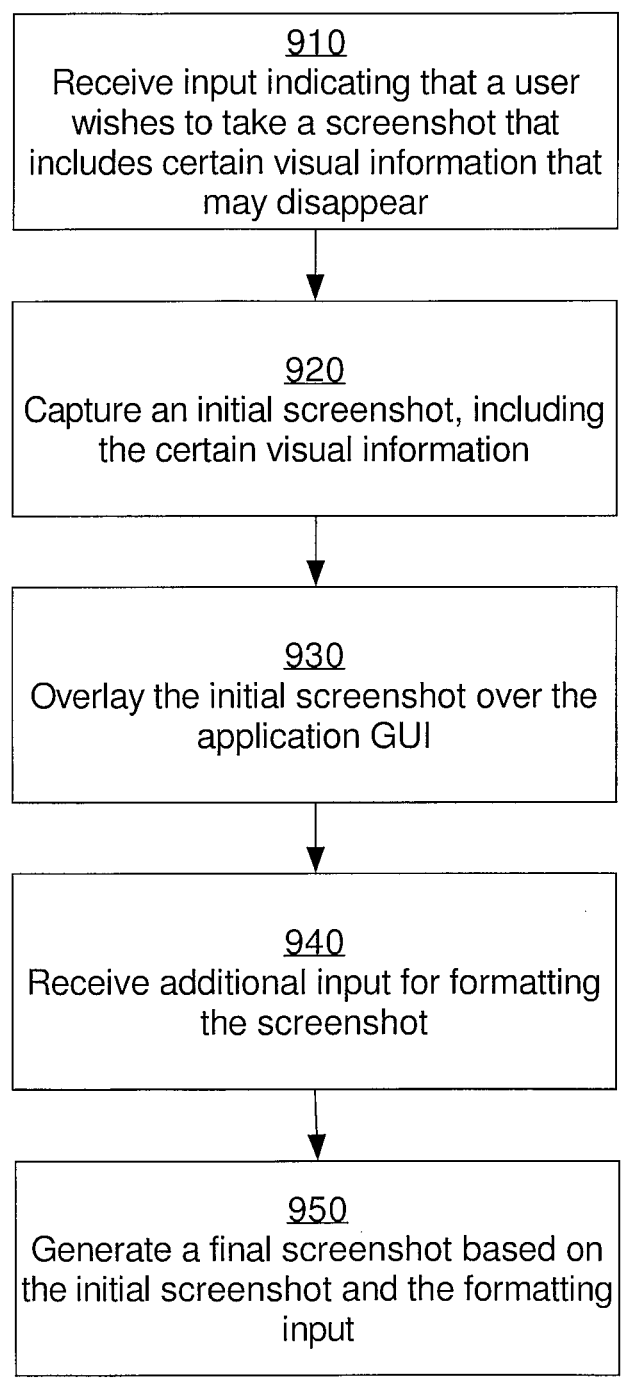
FIG. 9 is a flow chart 900 illustrating a method for generating a screenshot that includes visible information that would otherwise be lost with conventional screenshot techniques.

FIG. 9 is a flow chart 900 illustrating a method for generating a screenshot that includes visible information that would otherwise be lost with conventional screenshot techniques.

At step 910, the application receives input indicating that the user would like to take a screenshot. The input is received while the application is displaying in its GUI one or more visual elements, such as pop-up windows, pull-down boxes, or auto-complete boxes, that would disappear if the user were to trigger a screenshot using conventional techniques. According to an embodiment, the received input is input that will not affect the visual appearance of the GUI at the time that the user provided the input. For example, an application may be configured to listen for a pre-defined keystroke, such as CTRL-INSERT or ALT-INSERT. According to an embodiment, the certain visual information is visual information that would disappear if the user moved the mouse, and the received input is any input that does not require mouse movement.

At step 920, the application captures an initial screenshot, including the certain visual information. For example, if the application is displaying a fly-away auto-complete box when the input of step 910 is received, the application takes a screenshot of the complete GUI window, including the fly-away auto-complete box. The initial screenshot may be in BMP or any other suitable image format.

At step 930, the application overlays the initial screenshot over the application GUI, so that the GUI appears to the user to be frozen at the time the user provided the input of step 910.

At step 940, the application receives additional input for formatting the screenshot. For example, the application may receive input for annotating or cropping the screenshot, as discussed in previous sections.

Figure 10:
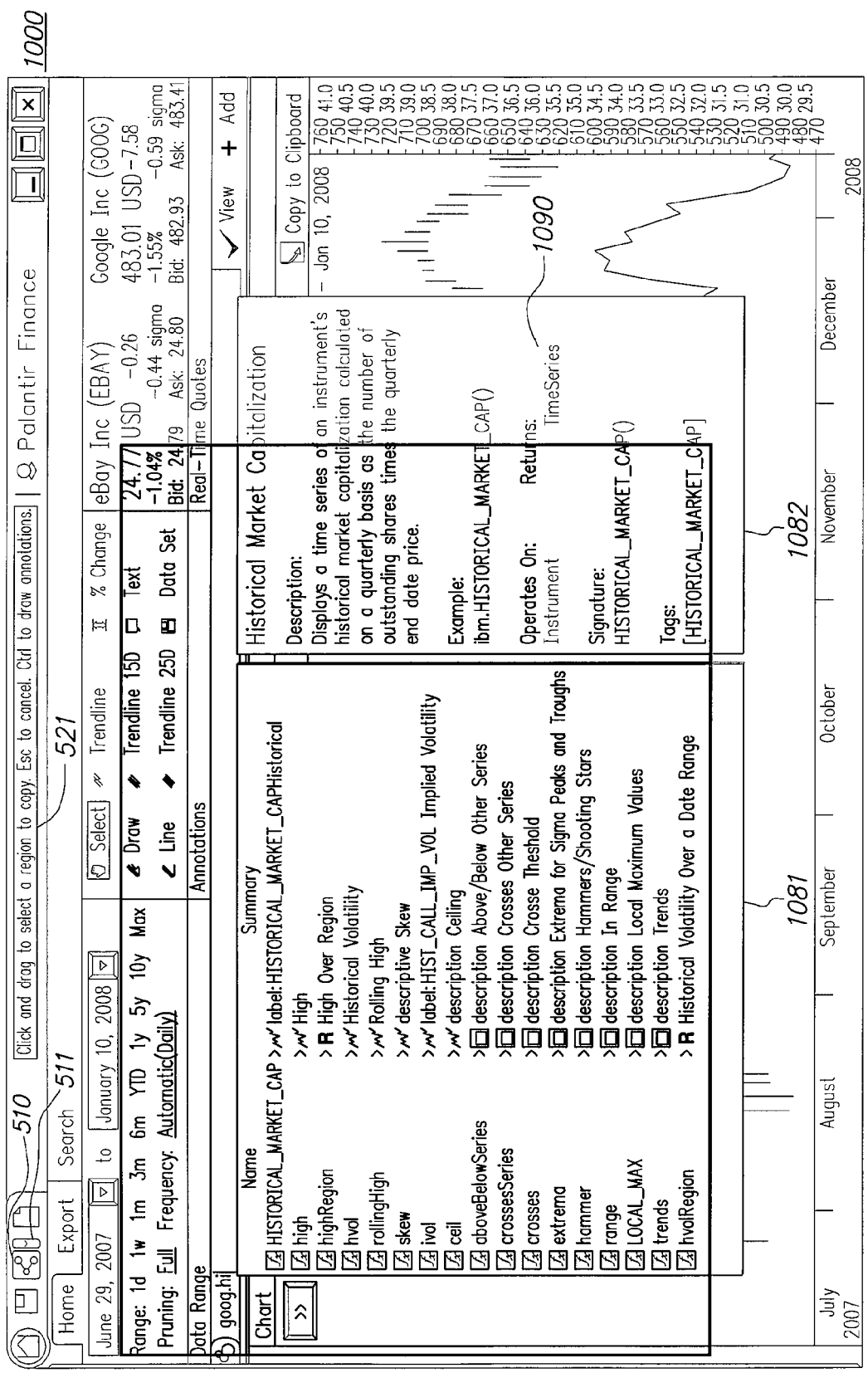
FIG. 10 illustrates a GUI window 1000 in which has been preserved for capture certain visual information that would have been lost if the user moved the mouse.

At step 950, the application generates a final screenshot based on the initial screenshot and the formatting input. For example, FIG. 10 illustrates a GUI window 1000 in which has been preserved for capture certain visual information that would have been lost if the user moved the mouse. GUI window 1000 is similar to GUI windows 500, 600, and 800 except that GUI window 1000 includes auto-complete boxes 1081 and 1082. An arbitrary screenshot region 1090 has further been defined for the screenshot, per input received in accordance with step 940.

4.0. Example Implementation Details

4.1. Example Buffer

According to an embodiment, upon generating the image, the application may place both the image and the link in a buffer, such as a system clipboard. The application may associate the image with the link in the buffer. Techniques for associating an image with a link in a buffer are described in, for example, documentation of the Microsoft Developer Network for using the Windows clipboard, "ms649016.aspx," on file with the U.S. Patent and Trademark Office in the prosecution history of the instant application. Performing the association may be implemented, for example, using Java program code or other programming languages. In the Windows system, the clipboard can store arbitrary different formats of data, and a program can pass the clipboard particular data for a given format. If the formats are different for two pieces of data, the data is automatically stored in association. Other Windows applications such as Microsoft Word, Adobe Acrobat, and Windows Notepad register to read different data formats, and when a user performs a paste operation in a particular application, whatever data is in the clipboard in a valid format for that application is received and used or stored by the application. Further information about Windows clipboard operation is described in the articles "Clipboard_(software)" and "Clipboard_manager" of Wikipedia on the Internet.

4.2. Sharing the Image and Link

According to an embodiment, once the application has placed the generated image and link in a buffer, the user may paste the generated image and link from the buffer into another type of document, such as an email, spreadsheet, or word-processing document, opened in another application capable of reading and understanding the data stored in the buffer. As a result of the user performing a paste operation, the other application embeds a hyperlinked image within the other document. Further, the image data is associated with the link in the buffer in a manner that allows for graceful degradation, such that the other application receives and uses only the image, or only the link, if the other application is unable to use both, according to the capabilities of the other application. For example, if a user pastes the image with embedded link into a plain text editor program such as Windows Notepad, the Notepad application receives and can use or store the link, although Notepad cannot accept the image.

The user may then share this other document with another user. For example, the user may transmit the other document to the other user via email, or place the other document in a shared location where the other user can locate it. The other user may use the other application to open the other document on the other user's computer. Because the link is embedded in the image, the link is transported with the image in the sharing process and is always associated with the image. When the other user views the hyperlinked image in the other document, the other user may trigger the associated link by performing an action such as clicking on the hyperlinked image. The exact user action necessary to trigger the associated link depends on the other application.

The other user's computer should be configured in such a manner that the computer can determine, based on the link, that the document whose location is identified by the link should be opened with the original application. Assuming the original application is installed on the other user's computer, this configuration may be performed when the original application is installed. For example, the original application may only edit documents with a certain extension type. The original application may register the extension type as being associated with the original application. This registration may take place, for example, in a system registry, configuration file, browser extension database, or any other applicable registrar. Because of this registration, when the user triggers the associated link, the other user's computer will automatically launch the original application and open the original document.

4.3. Reference Drafts

In some embodiments, the original application may save a reference draft of the document just prior to creating the image. The link may refer to this reference draft of the document instead of the document draft that was originally opened by the user. The reference draft may be write-protected so as to ensure that the reference draft always includes the same information that was contained in the document at the time the image was generated.

4.4. Example Protocol

In some embodiments, it may be desirable to communicate the original document to users via a special protocol rather than as a conventional file. For example, the original document may be stored on a secure server. The administrator of that server may not want the document to be duplicated or cached on clients. Or, the server may store the original document in a format that cannot be understood by the file system on the client. Or, the server may offer functionality that would be unavailable if the document were shared at a conventional layer. Further, the document may contain data attributes, and it may be desirable to generate a display from the document by dynamically updating the data attributes with current data values that are obtained by the server at the time that the document is opened, rather than storing the data values in the document. For example, a document might represent a chart of a stock that trades under the symbol ABC, and it is desirable to save the fact that ABC is on the chart and the range of data shown on the chart. When the chart is opened, current data associated with ABC for the specified range is retrieved and rendered.

In this embodiment, the link is structured as a URI, and the protocol is identified in the URI. The protocol can implicitly identify an application that is to be launched when the hyperlink is followed, to enable that application to find and open the document from which the image was generated.

In such embodiments, the protocol designated by the link may be registered with the other user's computer as associated with the original application. One technique for performing such a registration is described in "Registering an Application to a URL protocol" on Microsoft Developer's Network, available at the time of writing at the domain msdn.microsoft.com with the path/en-us/library/and the filenmae aa767914.aspx, hereby incorporated by reference for all purposes as if fully set forth herein. When the computer encounters a link that designates this other protocol, it launches the original application and requests that the original application handle the link. For instance, while most documents shared over the internet are shared using the Hyper-text Transfer Protocol (HTTP), and thus handled by a computer's browser, the link could instead designate another protocol uniquely associated with the original application This technique may also be useful for ensuring that the original application will launch in response to a link even when the original document lacks a predictable extension.

In an embodiment, a protocol denoted "pfinance," is one example of a unique protocol adapted to the purpose of communicating files. This protocol may be registered as being associated with an application such as Palantir Finance, commercially available from Palantir Technologies, Inc., Palo Alto, Calif. The protocol may allow an application to communicate information, including documents, with a server, such as a Palantir Finance server.

Each document on the server may be identified using a unique identifier. This identifier may be a filename. Or, to avoid requiring users to generate unique filenames for their documents and document drafts, the identifier may be generated by the server. Using the example protocol, a document draft having the identifier "report1234," and located on a server having the address 10.0.0.1, is referenced in a link with the following form:

pfinance://10.0.0.1/open/report1234

In the example link above, "pfinance" is a protocol name that is registered with a user computer in association with an application program such as Palantir Finance. The portion of the link between the server address and the document name, "open," designates an action for the server or client to perform with respect to the document. Thus, in the example above, the hyperlink instructs the Palantir Finance to open the "report1234" document. Other types of actions may also be designated in the link.

Document identifiers may include any string of alphanumeric characters. Mnemonic names such as "report" are not required.

4.5. Other Embodiments

Although the above techniques are described with respect to shared images, they may also be applicable to other forms of media capable of communicating information, including videos, slideshows, audio, and mixed media forms. An application may generate any type of media or associated link in response to a user action such as clicking on a "one-click sharing" button. The generated media and associated link may be copied to a buffer and pasted to another document.

Furthermore, although the above techniques are described with respect to links that cause a computer to launch the original document in the original application, links may instead cause the computer to launch other documents associated with the information depicted in a shared image. These other documents may be launched in other applications.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
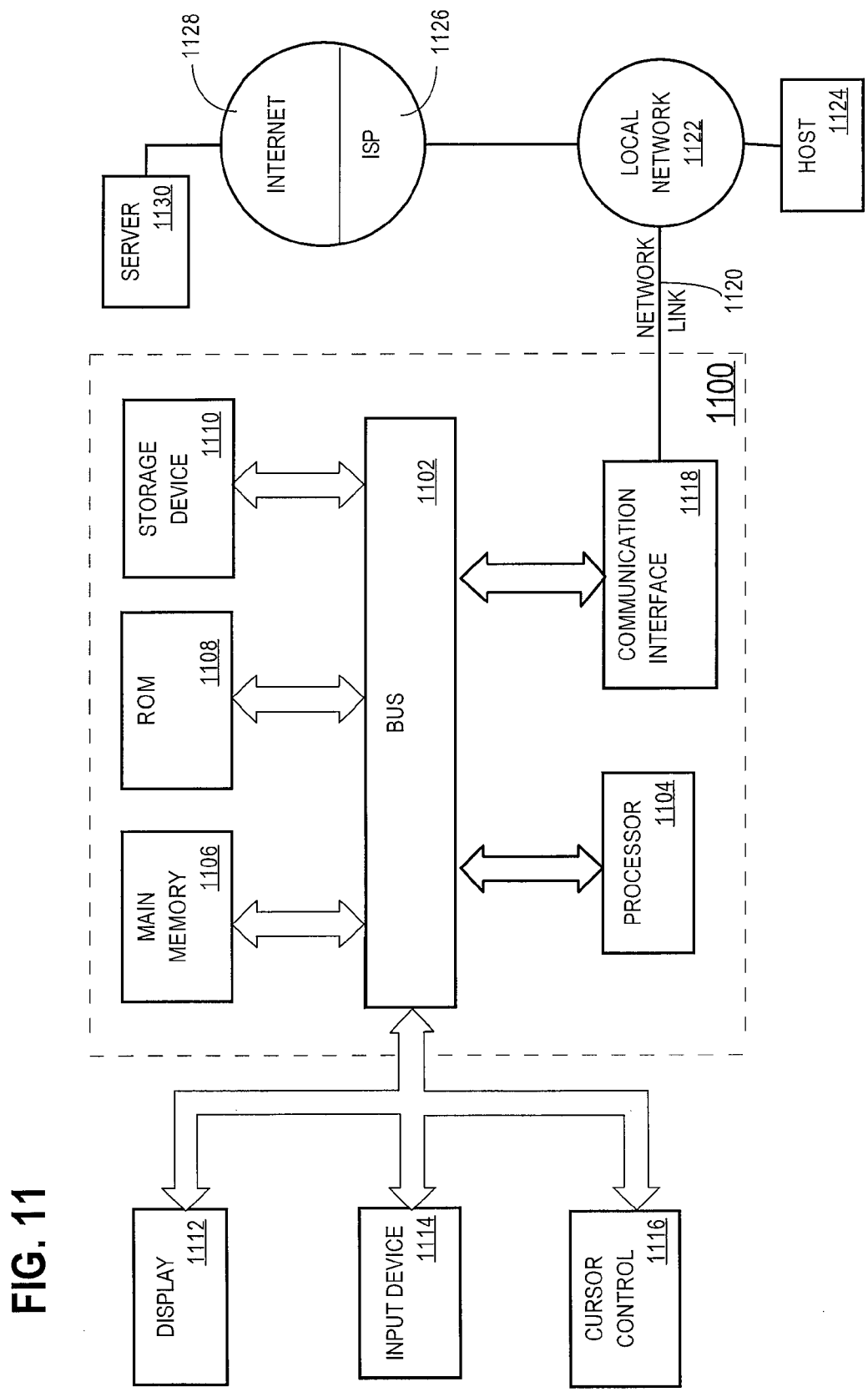
FIG. 11 is block diagram of a computer system upon which embodiments of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120a that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120a typically provides data communication through one or more networks to other data devices. For example, network link 1120a may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120a and through communication interface 1118, which carry the digital data to and from computer system 1100, are example forms of transmission media.

Computer system 1100 can send messages and receive data, including program code, through the network(s), network link 1120a and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    while displaying on an output device a visual presentation of a document that is receiving edits, receiving input requesting a screenshot;
    in response to the input requesting the screenshot, generating an image based on the visual presentation;
    further in response to the input requesting the screenshot, creating a reference draft of the document in association with the screenshot, wherein the reference draft is stored at a new location that is different than an original location from which the document was initially opened for editing;
    identifying a location at which the document that is receiving edits is stored, wherein the identified location is the new location of the reference draft;
    further in response to the input requesting the screenshot, generating a link to the document, the link specifying the identified location; and
    further in response to the input requesting the screenshot, placing the image and the link in a buffer that is shared with a plurality of applications executing at a computing device;
    wherein the method is performed by one or more computing devices.

2. The method of claim 1, wherein placing the image and the link in the system clipboard comprises associating the image with the link in the buffer.

3. The method of claim 1, wherein the image and the link are stored in the system clipboard in such a manner as to cause an application to, in response to a single paste operation, insert both the image and the link in another document.

4. The method of claim 1, wherein the method is performed by at least one of: an application in which the document is open or a process external to said application.

5. The method of claim 1, wherein the identified location is a unique location from which the document may be edited.

6. The method of claim 1, wherein the link identifies a protocol and an action to perform with respect to the document.

7. The method of claim 1, wherein the input is a first input and the image is a first image, the method further comprising:
    prior to receiving the first input from the user:
        in response to an initial input from the user, generating an initial image based on the information, wherein the initial image depicts the visual presentation; and
        providing the user with one or more interfaces for generating a modified version of the initial image:
            cropping the initial image; or
            annotating the initial image;
    wherein the first image is the modified version of the initial image.

8. The method of claim 1, wherein the identified location references a server of financial instrument documents, including the document, wherein the image is a graph based on the document.

9. The method of claim 1, further comprising creating a plurality of different editable drafts of the document in response to a plurality of different requests for screenshots, wherein each of the plurality of different screenshots is associated with a different link to a different location at which a corresponding different editable draft is stored.

10. The method of claim 1, wherein the buffer is a temporary buffer in a system clipboard.

11. One or more storage media storing instructions which, when executed by one or more processors at one or more computing devices, cause:

while displaying on an output device a visual presentation of a document that is receiving edits, receiving input requesting a screenshot;

in response to the input requesting the screenshot, generating an image based on the visual presentation;

further in response to the input requesting the screenshot, creating a reference draft of the document in association with the screenshot, wherein the reference draft is stored at a new location that is different than an original location from which the document was initially opened for editing;

identifying a location at which the document that is receiving edits is stored, wherein the identified location is the new location of the reference draft;

further in response to the input requesting the screenshot, generating a link to the document, the link specifying the identified location; and further in response to the input requesting the screenshot, placing the image and the link in a buffer that is shared with a plurality of applications executing at a computing device.

12. The one or more storage media of claim 11, wherein placing the image and the link in the system clipboard comprises associating the image with the link in the buffer.

13. The one or more storage media of claim 11, wherein the image and the link are stored in the system clipboard in such a manner as to cause an application to, in response to a single paste operation, insert both the image and the link in another document.

14. The one or more storage media of claim 11, wherein the method is performed by at least one of: an application in which the document is open or a process external to said application.

15. The one or more storage media of claim 11, wherein the identified location is a unique location from which the document may be edited.

16. The one or more storage media of claim 11, wherein the link identifies a protocol and an action to perform with respect to the document.

17. The one or more storage media of claim 11, wherein the input is a first input and the image is a first image, the method further comprising:
prior to receiving the first input from the user:
in response to an initial input from the user, generating an initial image based on the information, wherein the initial image depicts the visual presentation; and
providing the user with one or more interfaces for generating a modified version of the initial image:
cropping the initial image; or
annotating the initial image;
wherein the first image is the modified version of the initial image.

18. The one or more storage media of claim 11, wherein the identified location references a server of financial instrument documents, including the document, wherein the image is a graph based on the document.

19. The one or more storage media of claim 11, wherein the instructions, when executed by the one or more processors, further cause creating a plurality of different editable drafts of the document in response to a plurality of different requests for screenshots, wherein each of the plurality of different screenshots is associated with a different link to a different location at which a corresponding different editable draft is stored.

20. The one or more storage media of claim 11, wherein the buffer is a temporary buffer in a system clipboard.

21. A method comprising:
receiving first input indicating that a user intends to capture a screenshot of a graphical user interface window;
in response to the first input, providing the user with an interface for manipulating the screenshot;
identifying a plurality of predefined regions of the graphical user interface window;
receiving second input indicating a screenshot region, wherein the screenshot region is an arbitrary user-defined region of the graphical user interface;
receiving, via the interface for manipulating the screenshot, final input indicating that the user is ready to take the screenshot;
determining that screenshot region overlaps a first plurality of pre-defined regions, and that a portion of the first plurality of pre-defined regions is outside of the screenshot region;
responsive to the final input and the determining, expanding the screenshot region to include the first plurality of pre-defined regions;
based on the expanded screenshot region, generating an image of the first plurality of pre-defined regions of graphical user interface window;
wherein the method is performed by one or more computing devices.

22. The method of claim 21, further comprising, prior to the final input, receiving third input specifying the one or more actions to perform, the one or more actions including overlaying an annotation upon the screenshot.

23. The method of claim 22, wherein the third input comprises a simultaneous keystroke and mouse movement, wherein the annotation is a drawing based on the mouse movement.

24. The method of claim 21, further comprising:
receiving, after the first input but prior to the final input, third input including a movement of said cursor;
wherein the screenshot includes one or more visual elements from the graphical user interface that, prior to the first input, would have disappeared if the user moved a cursor.

25. The method of claim 21, further comprising, in response to the first input, freezing the graphical user interface.

26. The method of claim 21, further comprising, in response to the first input, generating an initial screenshot and overlaying the initial screenshot upon the graphical user interface while waiting for the final input.

27. The method of claim 21, further comprising at least one of: placing the image in a buffer or saving the image to a file.

28. The method of claim 21, wherein the method is performed by at least one of: an application in which the document is open or a process external to said application.

29. The method of claim 21, further comprising, while receiving user input defining the arbitrary user-defined region, in response to inputs indicating movements of a cursor defining the arbitrary user-defined region, the interface for manipulating the screenshot identifying a tentative user-defined region that would result from the user input thus far received and overlaying a visual filter over each particular pre-defined region with which the tentative user-defined region overlaps.

30. One or more storage media storing instructions which, when executed by one or more processors, cause:
receiving first input indicating that a user intends to capture a screenshot of a graphical user interface window;
in response to the first input, providing the user with an interface for manipulating the screenshot;

identifying a plurality of predefined regions of the graphical user interface window;

receiving second input indicating a screenshot region, wherein the screenshot region is an arbitrary user-defined region of the graphical user interface;

receiving, via the interface for manipulating the screenshot, final input indicating that the user is ready to take the screenshot;

determining that screenshot region overlaps a first plurality of pre-defined regions, and that a portion of the first plurality of pre-defined regions is outside of the screenshot region;

responsive to the final input and the determining, expanding the screenshot region to include the first plurality of pre-defined regions;

based on the expanded screenshot region, generating an image of the first plurality of pre-defined regions of graphical user interface window.

31. The one or more storage media of claim 30, further comprising, prior to the final input, receiving third input specifying the one or more actions to perform, the one or more actions including overlaying an annotation upon the screenshot.

32. The one or more storage media of claim 31, wherein the third input comprises a simultaneous keystroke and mouse movement, wherein the annotation is a drawing based on the mouse movement.

33. The one or more storage media of claim 30, wherein the instructions, when executed by the one or more processors, further cause:

receiving, after the first input but prior to the final input, third input including a movement of said cursor;

wherein the screenshot includes one or more visual elements from the graphical user interface that, prior to the first input, would have disappeared if the user moved a cursor.

34. The one or more storage media of claim 30, wherein the instructions, when executed by the one or more processors, further cause, in response to the first input, freezing the graphical user interface.

35. The one or more storage media of claim 30, wherein the instructions, when executed by the one or more processors, further cause, in response to the first input, generating an initial screenshot and overlaying the initial screenshot upon the graphical user interface while waiting for the final input.

36. The one or more storage media of claim 30, wherein the instructions, when executed by the one or more processors, further cause at least one of: placing the image in a buffer or saving the image to a file.

37. The one or more storage media of claim 30, wherein the instructions are executed by at least one of: an application in which the document is open or a process external to said application.

38. The one or more storage media of claim 30, wherein the instructions, when executed by the one or more processors, further cause while receiving user input defining the arbitrary user-defined region, in response to inputs indicating movements of a cursor defining the arbitrary user-defined region, the interface for manipulating the screenshot identifying a tentative user-defined region that would result from the user input thus far received and overlaying a visual filter over each particular pre-defined region with which the tentative user-defined region overlaps.

\* \* \* \* \*